US006985731B1

(12) United States Patent
Johnson et al.

(10) Patent No.: US 6,985,731 B1
(45) Date of Patent: Jan. 10, 2006

(54) LOCATION DEFINED CONTROL OF CELLULAR SYSTEM

(75) Inventors: Derek Johnson, Smyrna, GA (US); Michael L. Heubel, Marrieta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 797 days.

(21) Appl. No.: 09/822,256

(22) Filed: Apr. 2, 2001

(51) Int. Cl.
*H04Q 7/20* (2006.01)
*H04Q 7/00* (2006.01)

(52) U.S. Cl. .................. 455/436; 455/441; 455/456.3; 370/331

(58) Field of Classification Search ................ 370/310, 370/331; 455/440, 437, 432.1, 436, 441, 455/456.3; 342/357.09
See application file for complete search history.

(56) References Cited

U.S. PATENT DOCUMENTS

| 4,829,554 | A | * | 5/1989 | Barnes et al. ............ 455/432.1 |
| 5,327,575 | A | * | 7/1994 | Menich et al. .............. 455/437 |
| 5,355,515 | A | | 10/1994 | Sicher |
| 5,499,387 | A | * | 3/1996 | Chambert ................... 455/436 |
| 5,682,380 | A | * | 10/1997 | Park et al. .................. 370/331 |
| 5,697,057 | A | | 12/1997 | Bursztejn et al. |
| 5,991,626 | A | | 11/1999 | Hinz et al. |
| 6,055,432 | A | | 4/2000 | Haleem et al. |
| 6,061,337 | A | * | 5/2000 | Light et al. .................. 370/331 |
| 6,157,621 | A | * | 12/2000 | Brown et al. ............... 370/310 |
| 6,211,819 | B1 | * | 4/2001 | King et al. ............ 342/357.09 |
| 6,438,376 | B1 | * | 8/2002 | Elliott et al. ................ 455/437 |
| RE38,267 | E | * | 10/2003 | Borkowski et al. ....... 455/456.3 |
| 6,711,408 | B1 | * | 3/2004 | Raith .......................... 455/440 |
| 2002/0072370 | A1 | * | 6/2002 | Johansson et al. .......... 455/436 |
| 2005/0026619 | A1 | * | 2/2005 | Jha ............................. 455/441 |

OTHER PUBLICATIONS

Cell Traffic and Handoff (Jun. 13, 1998) (www.coecs.ou.edu/vdebrunn/www/wireless/handoff.pdf).
R.C. Levine, Digital Switching (Jan. 1997).
U.S. Appl. No. 09/822,257, filed Apr. 2, 2001, entitled Location Defined Control of Cellular System, Inventor, Johnson et al.
U.S. Appl. No. 09/822,257, dated Nov. 17, 2004, Official Action.
FCC Report and Order, (fcc.gov/Bureaus/Wireless/Orders/1996/fcd96264.txt), 52 pp., Jul. 26, 1996.
FCC Third Report and Order, (fcc.gov/Bureaus/Wireless/Orders/1999/fcc99245.txt), 30 pp., Oct. 6, 1999.
Cell Traffic and Handoff (Jun. 13, 1998) (coecs.ou.edu/vdebrunn/www.wireless/handoff.pdf), pp. 156-167.
Farley, Tom, Cellular Telephone Basics: AMPS & Beyond (privateline.com/Cellbasics/Cellbasics.html), 46 pp., Mar. 23, 2001.

(Continued)

*Primary Examiner*—William D. Cumming
(74) *Attorney, Agent, or Firm*—Cantor Colburn LLP

(57) ABSTRACT

A system and method for controlling operations in a cellular system is disclosed. A serving cell or the mobile telephone switching office (MTSO) determines that a portable wireless device operating in a serving cell needs to be handed off (a "handoff"). The position of the portable wireless device is determined. The position may be determined based on any of a variety of localization techniques, such as time difference of arrival (TDOA), angle of arrival (AOA), location pattern matching (LPM), global positioning system (GPS), or other localization techniques. A target cell is selected based on the position of the portable wireless device. Generally, the target cell is selected as the cell that is closest to the portable wireless device. Factors such as a position vector and/or a velocity vector may be assessed in selecting the target cell. Based on the target cell that is selected, the MTSO assigns the portable wireless device to the target cell and the transmission is handed off to the new cell.

1 Claim, 5 Drawing Sheets

OTHER PUBLICATIONS

Farley, Tom, Mobile Telephone History (privateline.com/PCS/history9.htm), 11. pp., Mar. 23, 2001.

Farley, Tom, Digital Wireless Basic—Basic Wireless Principles (.privateline.com/PCS/HowPCSworks.html), 9 pp., Mar. 23, 2001.

TDMA Technologies (..utdallas.edu/~xu8589/cs6386/tech.htm), 6 pp., Mar. 23, 2001.

Levine, R.C., Digital Switching (Jan. 1997), pp. 1-100.

Glossary of Cellular Services (.btc.bm/Mobility/cellular_glossary.htm), 7 pp., Mar. 18, 2001.

Cooper, Martin, A Layman's Guide to Cellular, 1996 Annual Review of Communications, pp. 993-997, 1996.

Common Cellular Terms UsedToday (.btc.bm/Mobility/cellular_terms.htm), 3 pp., Mar. 18, 2001.

How Does Wireless Work? (.btc.bm/how wireless works.htm), 2 pp., Mar. 18, 2001.

The Future of Wireless? (.btc/bm/future.htm), 1 p., Mar. 18, 2001.

About BTC Mobility (.btc.bm/Mobility/about_mobility.htm), 1 p., Mar. 18, 2001.

Demystifying Cellular (.btc.bm/Mobility/mystery.htm), 2 pp., Mar. 18, 2001.

How Cellular Works (cltel.com/HTML/HowCell.html), 2 pp., Mar. 18, 2001.

Section H-4: Understanding Networking Technologies (.smartcommunities.org/guide/html/body h-4 wireless.html), 5 pp., Mar. 18, 2001.

Trinity College Dublin—Mobile Communications Technologies (. ntrg.cs.tcd.ie/cs5/98/grp0pg16.html);, 1 p., (Mar. 18, 2001.

Phreaker, Phantom, Mobile Communication, vol. One, Issue Five, Phile #9 of 12 (.phrack.infonexus.com/search.phtml?view&article+p5-9), 4 pp., Apr. 14, 1986.

Scientific-Atlanta, Wireless Local Loop and Cellular Systems Using Satelite Trunking (white paper), 6 pp., 1996.

Wireless Connectivity (ei.cs.vt.edu/~wwwbtb/book/chap17/cellular.htm), 2 pp., Dec. 10, 1996.

FCC—Cellular Radiotelephone Service—Cellular Summary (.fcc.gov./wtb/cellular/celfctsh.html), 2 pp., Jan. 2, 2001.

Radio Design Group, Inc.—How It Works: Cellular Phones! (radiodesign.com/cellwrks.htm), 3 pp., Jan. 4, 2001.

Trinitry College Dublin—Mobile Communications—Cellular Radio (.ntrg.cs.tcd.ie/cs5/98/grp0pg6.html);, 2 pp., Mar. 18, 2001.

* cited by examiner

LOCATION DEFINED CONTROL OF CELLULAR SYSTEM

FIELD OF THE INVENTION

The present invention generally relates to communications technology and, more particularly, to channel allocation in cell sites.

BACKGROUND OF THE INVENTION

Geographic reuse of frequencies, sometimes called "frequency reuse," is a distinguishing feature of cellular systems. Because a limited swath of the RF spectrum is available, frequencies are reused in order to provide a cellular system with an acceptable capacity. This is accomplished by breaking up the coverage area into a number of cells, or cell sites, each having a relatively low-powered transmitter. The transmitter has sufficient power to cover the cell site without interfering with other cell channels.

Frequencies can be reused by spacing "same channel" cells sufficiently far apart that the likelihood of interference is minimized. This permits two conversations to occur simultaneously on the same channel without conflict. Frequency reuse may be implemented using an architecture with a "reuse pattern." A reuse pattern is a building block of cells that is repeated in order to build up to the coverage area.

For example, in an n=7 cellular system, seven cells define the reuse pattern. For example, there may be a first cell A1 surrounded by six cells B1–G1. Placed adjacent to these first seven cells is a second set of cells with the same pattern, an A2 cell surrounded by six cells B2–G2. Additional sets of seven cells are added (A3–G3, A4–G4, and so forth) to build up to the entire coverage area.

The spacing between same channel cells is a function of the reuse pattern. In an n=7 system, at least two cells have to be traversed to arrive at a same channel cell (e.g., the spacing between A1 and A2 or between C1 and C2). As n increases, spacing between same channel cells increases. As n decreases, spacing between same channel cells decreases.

Frequency reuse is one way to increase subscriber capacity in spite of the constraints imposed by the finite number of available channels. Frequency reuse has its limitations, however. For a given cell transmitter power and cell size, same channel cells can be spaced only so closely before interference becomes a problem.

Sometimes subscriber capacity can be increased through cell-splitting. In cell-splitting, each cell is split into subcells, with each subcell having its own transmitter. This permits greater frequency reuse, although the transmitter power of adjacent cells may have to be reduced to avoid interference. A significant drawback of cell-splitting is the cost of installing the new hardware. Additionally, many jurisdictions have regulations severely limiting cellular providers' ability to install new antennas.

Another disadvantage of cell-splitting is the increased complexity it creates in the cellular system. Furthermore, the likelihood of interference or dropped calls can increase. The burden on the Mobile Telephone Switching Office (MTSO), which coordinates these operations, thus increases significantly.

Another complication of cell-splitting is that as cell size decreases, the number and rate of "handoffs" increases. A handoff occurs when a cell phone moves from a first cell to a second cell. The MTSO controls handoffs, which entails commanding the cell phone to switch to a channel in the new cell. The connection between the cells and the MTSO is also switched so that the call is routed between the new cell and the MTSO. Thus, as the user moves between cells, the call is "handed off" from one cell to another.

Handoffs are necessary to manage moving callers in a cellular-type system. However, handoffs can create certain difficulties. The number and rate of handoffs can impose a significant processing burden on the MTSO. Because multiple cell sites may transmit during the handoff process, the overall noise floor of the RF environment is raised. This reduces overall capacity of the system.

When handoffs are mishandled, calls may be dropped or may be handed off to a less-than-optimum cell. If a call is handed off to a less-than-optimum cell, a handoff to a better cell may be required in a short period of time.

As wireless carriers continue to grapple with frequency reuse and handoff issues, new challenges have arisen on other fronts. In order to address routing of emergency calls placed by cellular phones, the Federal Communications Commission (FCC) has issued a series of orders. These orders mandate that wireless providers begin supplying location information to public safety answering points ("PSAPs") in order to support an enhanced 911 (known as "E911") capability for portable wireless devices ("PWDs"). According to the FCC mandate, wireless providers must provide a Phase I capability in 2000, followed by a more robust Phase II capability in 2001.

The Phase I capability requires that wireless carriers provide general location information. The general location information would locate the PWD to within a cell site or cell sector.

In Phase II, the wireless providers must provide specific location information. The Phase II localization accuracy requirement depends on whether the localization technique is network-based or handheld-based. For network-based localization solutions, the accuracy must be at least within 125 m at a one standard deviation probability (67%) and at least within 300 m at two standard deviations (95%). For handheld localization solutions, the accuracy must be at least within 50 m at one standard deviation and at least within 150 m at two standard deviations.

As a result of these FCC orders, a number of different techniques for localizing PWDs have been developed to support E911. Network-based solutions include TDOA (time difference of arrival), AOA (angle of arrival), TDOA/AOA in combination, and LPM (location pattern matching). Handheld-based solutions include GPS (global positioning system).

TDOA localization relies on the fact that a signal transmitted by a PWD can be received at multiple cell site transceivers at slightly different times. If the signal is received at three cell site transceivers, the differential timing information can be used to compute a position for the PWD.

AOA localization relies on the fact that a signal transmitted by a PWD is typically received at different angles at multiple cell site transceivers. Using direction-finding (compass) circuitry at the cell sites, the angle of arrival is computed at each cell site receiving the signal. By processing the angles of arrival, a position can be computed.

TDOA/AOA is a combined approach that relies on a synthesis of the TDOA and AOA techniques. In this approach, coordinate pairs may be computed for both the TDOA and AOA techniques. The two coordinate pairs may then be averaged or otherwise combined. On the other hand, this approach may provide for selecting one or the other technique in some circumstances.

The location pattern matching (LPM) technique has been proposed for use in urban environments where tall buildings and other obstructions cause signal reflection and multipath phenomena. In LPM, the signal of the PWD is received at multiple cell site transceivers. The acoustic component of the signal is then analyzed and compared to a database of signal characteristics. The processing and database comparison permit signal anomalies such as multipath and echoes to be used to localize the PWD.

SUMMARY OF THE INVENTION

The present invention is directed to the control of a cellular system based on location information. According to one aspect of the invention, a system and method for controlling operations in a cellular system is disclosed. A serving cell or the mobile telephone switching office (MTSO) determines that a portable wireless device operating in a serving cell needs to be handed off (a "handoff"). This determination may be based on a diminishing signal strength and/or an increasing bit error rate of the transmission between the portable wireless device and the serving cell.

The position of the portable wireless device is determined. The position may be determined based on any of a variety of well-known localization techniques, such as time difference of arrival (TDOA), angle of arrival (AOA), location pattern matching (LPM), or global positioning system (GPS). Other techniques for determining the location of the portable wireless device could be employed.

A target cell is selected based on the position of the portable wireless device. Generally, the target cell is selected as the cell that is closest to the portable wireless device. However, other factors may be considered in selecting the target cell. For example, a position vector may be computed based on several measurements of the location of the portable wireless device. A velocity vector may be computed based on several measurements of the location of the portable wireless device. Factors such as the position vector and/or the velocity vector may be assessed in selecting the target cell. Accordingly, the target cell may be selected to be a cell other than the cell closest to the current position of the portable wireless device.

Based on the target cell that is selected, the MTSO assigns the portable wireless device to the target cell and the transmission is handed off to the new cell.

The advantages of the present invention are numerous. Dropped handoffs may be reduced. The processing burden associated with handoffs may be reduced. The number and rate of handoffs may decrease. The background noise associated with the handoff process may decrease, thus increasing overall subscriber capacity. Frequency reuse can be increased, so that same channel cells can be spaced closer. Channels for adjacent cells can be spaced closer.

Accordingly, an object of the invention is to provide handoffs based at least in part on location information of a portable wireless device.

Another object of the invention is to provide handoffs in a manner such that the incidence of dropped handoffs is reduced.

Another object of the invention is to provide handoffs in a manner such that the number and rate of handoffs are reduced.

Another object of the invention is to provide handoffs in a manner such that the overall system capacity is increased.

These and other objects of the present invention are described in greater detail in the following description of the invention, the appended drawings, and the attached claims.

DETAILED DESCRIPTION OF THE INVENTION

Figure 1:
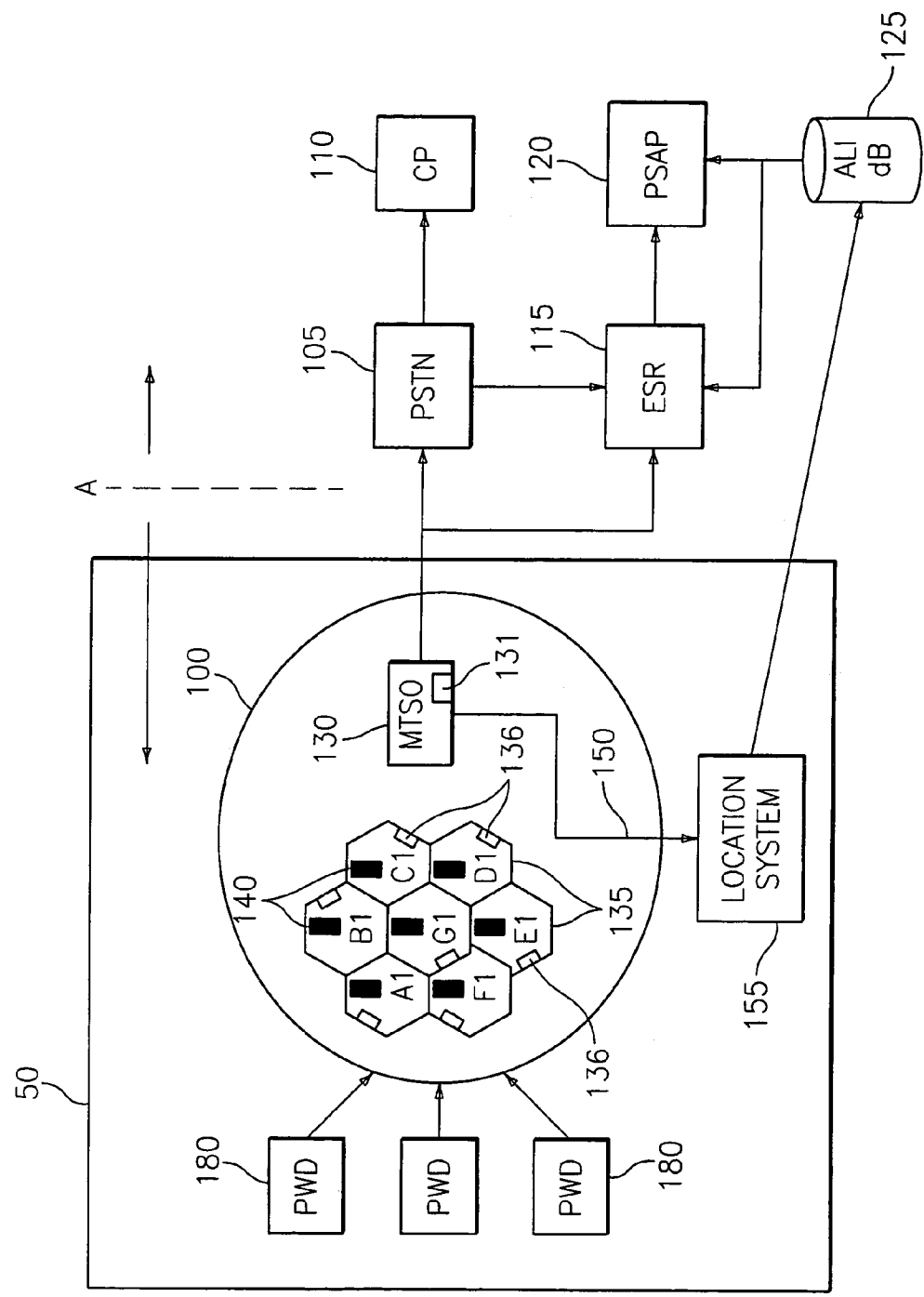
FIG. 1 provides a schematic block diagram of a system for performing location based handoffs according to an embodiment of the invention.

FIG. 1 is a block diagram, according to an embodiment of the invention, for a system 50 that uses location information for purposes of management and control of a cellular system. System 50 may be part of a larger system that includes an interface to the emergency services infrastructure of the public switched telephone network. The elements to the left of line A in FIG. 1 relate to a cellular system, while those elements to the right of line A relate to the public switched telephone network, sometimes referred to as the Plain Old Telephone System or "POTS."

Portable wireless devices 180 interface with cellular system 100 to place phone calls (or to transmit non-voice data) to other portable wireless devices 180 in cellular system 100 or to devices (e.g., land line telephones) in the public switched telephone network (PSTN). The portable wireless devices 180 could be any two-way device that permits the position of the device to be localized using suitable localization technologies, such as TDOA, AOA, TDOA/AOA, LPM, GPS, and any other existing or future technology for locating two-way portable devices.

Portable wireless device 180 could be a portable cellular phone, a mobile phone, a two-way pager, a personal data assistant (PDA), or any other two-way transceiver type device that is portable and that permits localization. While portable wireless device 180 is preferably handheld, it could alternatively be installed in a vehicle.

Portable wireless devices (PWDs) 180 interface with cellular system 100, which could be a digital or analog system. Both digital and analog cellular systems are well known in the art, including the cellular systems using TDMA (time division multiple access), CDMA (code division multiple access), FDMA (frequency division multiple access), so-called "mDiversity," or other types of transmissions. For example, cellular system 100 could be an Advanced Mobile Phone System (AMPS), a Digital Advanced Mobile Phone System (D-AMPS), a Portable Communication System (PCS), a global system for mobile communications (GSM), or other cellular-based communications system.

Cellular system 100 includes a number of cell sites 135 (sometimes referred to as "base stations") having cell transceivers 140. Transmissions by portable wireless device 180 are generally received by a transceiver 140 in the "serving cell" (e.g., the cell site 135 most proximate to PWD 180) which forwards the transmission to the mobile telephone switching office (MTSO) 130. In reciprocal fashion, transmissions from other cellular phones, or from phones in the PTSN system, are transmitted from MTSO 130 to the transceiver 140 in the serving cell, which forwards the transmissions on to PWD 180. These transmissions may be FDMA, TDMA, CDMA, so-called "mDiversity," or any other suitable transmission type.

The connection between MTSO 130 and cell sites 135 may comprise a microwave link, wire line, or other means for reliably connecting MTSO 130 and cell sites 135. Cell sites 135 may comprise a computer or controller 136 for performing processing operations, such as for measuring received signal strength or bit error rate in the transmission from PWD 180. MTSO 130 may comprise a computer or controller 131 for performing processing operations, such as for measuring a received signal strength or bit error rate for PWD 180, for registering PWDs 180, for setting up calls, and for making handoffs.

As used herein, "computer" is accorded its broadest meaning. A computer may comprise a personal computer, minicomputer, microcomputer, mainframe, processor, microprocessor, controller, microcontroller, and any other means for processing data.

Referring to the right of line A on FIG. 1, MTSO 130 in system 50 may interface with the POTS telephone system for both regular calls and emergency calls. For a regular call, MTSO 130 interfaces with local exchange carriers in order to complete calls to a called party 110. For emergency calls, MTSO 130 interfaces with an emergency services router (ESR) 115 (directly, or via PSTN 105) in order to route an emergency (e.g., 911) call to the proper public service answering point (PSAP) 120.

In accordance with the well-known localization techniques previously discussed, system 50 is capable of identifying the location of a PWD 180. In one embodiment using the TDOA technique, differential timing information may be sent from MTSO 130 to location system 155, which computes a latitude/longitude (or X-Y) solution based on the differential timing information. In another embodiment using the AOA technique, the angle of arrival information may be sent from MTSO 130 to location system 155, which computes a latitude/longitude (or X-Y) solution based on the angle information. In yet another embodiment using the combined TDOA/AOA approach, differential timing and/or angle of arrival information is used to compute a location solution. In yet another embodiment using GPS technology, MTSO 130 collects GPS timing information from PWDs 180 equipped with GPS receivers. The GPS timing information is processed by location system 155 to compute a location. In yet another embodiment using GPS technology, MTSO 130 collects locations from PWDs 180 that perform their own location computations. According to other embodiments, system 50 provides location information using any other suitable existing or future technology for localization of two-way portable devices.

The location information of PWDs 180 provided by system 50 can be made available to an automatic location identification (ALI) database 125 for use in routing personnel responding to emergency calls. In addition or alternatively, this location information can be used by MTSO 130 in its control and management of calls in cellular system 100. In particular, MSTO 130 can use this location information in making handoffs within cellular system 100.

The general operation of an embodiment in accordance with exemplary system 50 in FIG. 1 is as follows. Generally, as PWD 180 moves the signal strength of its link with a serving cell site 135 varies. As the signal strength of PWD 180's link with the serving cell site 135 decreases, and/or as the signal strength of PWD 180's link with other cell sites 135 increases, it may be desirable for the call to be handed off from the serving cell site 135 to one of the other cell sites 135. When MTSO 130 decides to make a handoff, it selects a "target cell" from a number of so-called "candidate cells." Rather than relying exclusively on signal strength to select the target cell, system 50 uses its location information to select the "target cell." By processing location information, the handoff process is improved.

It should be understood that the block diagram of FIG. 1 is functional in nature and is, therefore, but one example of how the overall system architecture may be designed. In particular, MTSO 130 and location system 155 are shown in FIG. 1 to clearly illustrate the mobile switching operation of the one and localization operation of the other. However, MTSO 130 and location system 155 could easily be combined or further subdivided. For example, the localization processing performed by location system 155 could alternatively be performed by and integrated into MTSO 130.

As noted above, a handoff is what occurs when a PWD 180 being served by a serving cell is switched or transferred to another cell, e.g., a target cell. Handoffs may occur when traffic on the serving cell exceeds its capacity. Most commonly, however, handoffs arise when a mobile PWD 180 begins to leave the effective operating range of the serving cell. The circumstances of an exemplary handoff are now described.

Figure 2:
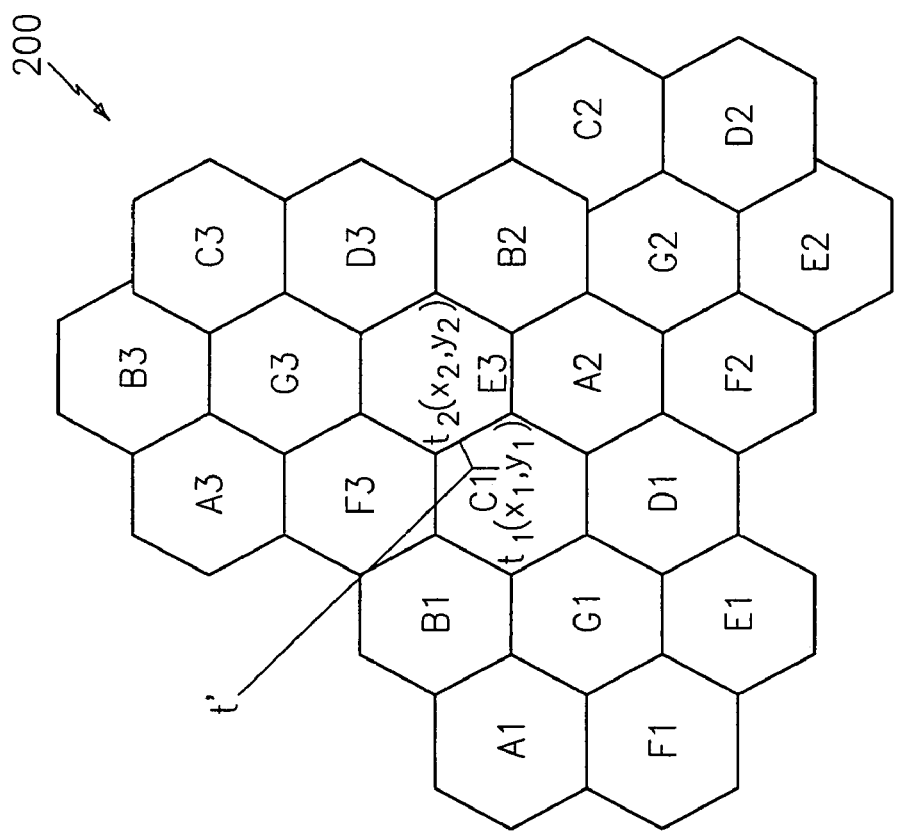
FIG. 2 is a diagram of a portion of an exemplary cellular system using a handoff to transfer a portable wireless device from one cell to another cell according to an embodiment of the invention.

FIG. 2 is a diagram of an exemplary portion 200 of a cellular system using a handoff to transfer a portable wireless device from one cell to another cell. This exemplary portion 200 corresponds to an n=7 reuse pattern, wherein A1, A2 and A3; B1, B2 and B3; C1, C2 and C3; and so forth correspond to same channel cells. Same channel cells are cells with channel sets that include at least one common channel.

For example, in FIG. 2 at time $t_1$ the portable wireless device was being served by serving cell C1. At time $t_1$, the portable wireless device is located at a position that could be defined by $x_1$, $y_1$, (x and y could correspond to Cartesian coordinates or to a longitude and latitude). At this time and position, the portable wireless device is operating on a channel in the channel set allocated to cell C1.

Referring back to FIG. 1, in an analog system such as the Advanced Mobile Phone System (AMPS), PWD 180's transmission is on a reverse voice channel received by the base station at cell C1 (one of seven cell sites 135 shown in FIG. 1). Cell C1 forwards this transmission to MTSO 130 which, in turn, forwards it through PSTN 105 to called party 110. PWD 180 receives a transmission on a forward voice channel transmitted by the base station at cell C1. PWD 180 may also transmit or receive data on a control channel allocated to the channel set of cell C1. The control channel may be used for such operations as registration, paging, and call set-up.

In a system other than AMPS, the transmissions between the portable wireless device and a base station are defined according to the protocols for those systems. For example, in a fully digital Time Division Multiple Access (TDMA) or Code Division Multiple Access (CDMA) system, the definition of a channel is different from that for an analog system such as AMPS. In particular, each portable wireless device may not be assigned a dedicated, discrete frequency for carrying the transmission. However, the underlying principle is the same. While the portable wireless device is being served by serving cell C1, a channel from the channel set for cell C1 is used. When a handoff becomes appropriate, the portable wireless device is switched to a channel associated with one of the other cells.

Referring back to FIG. 2, the portable wireless device is moving and at time $t_2$, the portable wireless device is located at a new position that could be defined by $x_2$, $y_2$ at the edge (or the "boundary") of serving cell C1. As the portable wireless device approaches this boundary, the quality of the transmission degrades and a handoff is appropriate.

In the conventional approach, cellular system 100 (FIG. 1) does not know that PWD 180 is located at $x_2$, $y_2$, or even that it is at the edge of the serving cell C1. Cellular system 100 simply detects the decreasing quality of the transmission, and infers that a handoff should be made. According to this approach, measurements are made on the strength of PWD 180's link with several candidate cell sites. Based on these measurements, a target cell is selected and the handoff is made. In this conventional approach, the decision as to which cell to hand PWD 180 off to depends largely or entirely on measured signal strength (e.g., radio signal strength indication [RSSI] and/or bit error rate [BER]).

A drawback to this approach is that the call ("call" is defined broadly herein to include a voice type transmission, data type transmission, or other transmission between a PWD 180 and cellular system 100) may not be handed off to the best candidate cell. Referring to FIG. 2, at time $t_2$ candidate cell F3 may have the best reception. For example, candidate cell F3 may be reporting a signal strength and/or bit error rate that is marginally better than that at candidate cell E3. In the above approach, MTSO 130 hands the call off to candidate cell F3.

However, in this exemplary scenario, it can be seen from FIG. 2 that the geographically closest cell at time $t_2$ is candidate cell E3. Therefore, it may actually be the better choice to hand the call off to candidate cell E3. The marginally better link for candidate cell F3 may be a temporary signal anomaly. For example, tall buildings may be partially blocking the transmission link between PWD 180 and candidate cell E3, thus reducing the strength of the signal. If the call is handed off to candidate cell F3, another handoff to cell E3 might be required in a short period of time. In the worst case, the quality of the transmission between the portable wireless device and cell F3 might degrade so rapidly that the call is dropped altogether.

Moreover, in FIG. 2 it can be seen that at time t' the trajectory of the portable wireless unit changed. Even if candidate cell F3 has a better link (i.e., better signal strength and/or bit error rate) than candidate cell E3 at the point of handoff, the trajectory makes it likely that best target cell is E3, not F3. When the call is handed off to F3, the result may be that additional handoffs are required and/or a dropped call may result.

In an improved approach according to an embodiment of the present invention, location information of the portable wireless device is employed in the handoff procedure. During the handoff procedure, a position of the portable wireless device is determined. The position may be determined using any of the localization technologies discussed previously. Any other reliable technique for locating a portable wireless device may be employed. The MTSO 130 (FIG. 1) uses this position information in determining the target cell. MTSO 130 may or may not consider signal strength and/or bit error rate information in making the determination.

Figure 3:
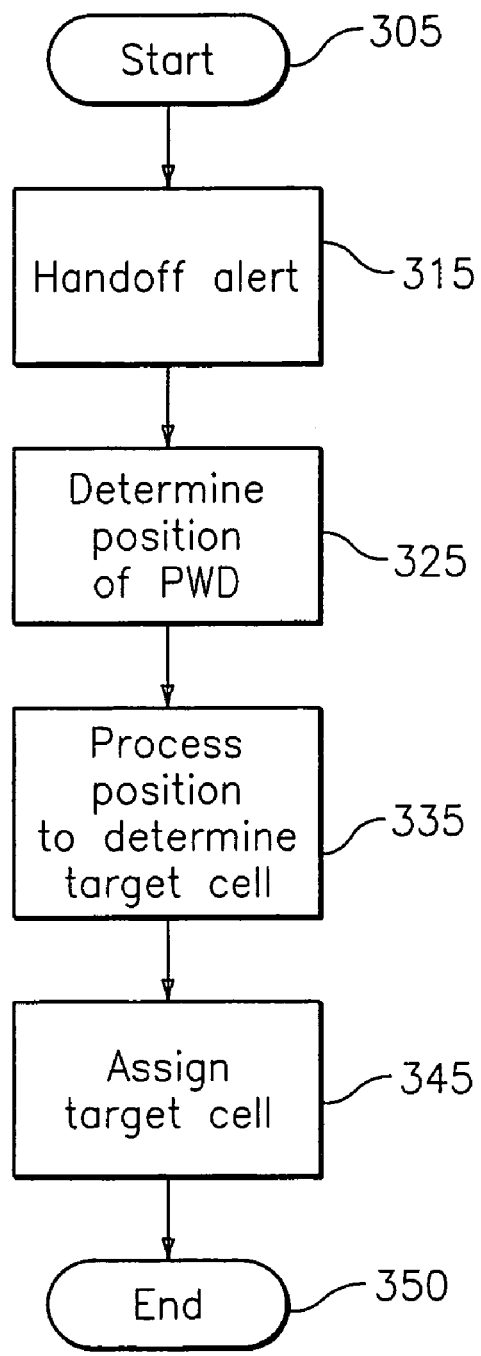
FIG. 3 is a flow chart of a method according to an embodiment of the invention for handoff assignment based on location information.

FIG. 3 is a flow chart of a method according to an embodiment of the invention for handoff assignment based on location information. In order to explain the invention, the method is described in connection with the structure of FIG. 1. This is done only to explain the invention clearly and should not be considered to limit the disclosed method to the structure of FIG. 1 or to any other structure.

The method starts at 305, at which point the PWD 180 is operating normally within a cell site 135. The handoff alert is generated at 315. The handoff alert may be generated by a serving cell 135 in cellular system 100 (FIG. 1) based on the transmission received by serving cell 135 from PWD 180. The handoff alert could be generated by MTSO 130 based on the signal it receives from the serving cell 135 corresponding to the PWD 180. It is also possible that a handoff alert could be generated by PWD 180 based on the transmission it is receiving from the serving cell 135.

The handoff alert may be generated in response to the signal strength of the link between the PWD 180 and serving cell site 135 degrading below some level (e.g., the RSSI falls below an RSSI threshold and/or the BER rises above a BER threshold).

Alternatively or in addition, a handoff alert may be generated in response to the signal strength of a link between the PWD 180 and one of the other cell sites 135 increasing beyond some level (e.g., the RSSI rises above an RSSI threshold and/or the BER falls below a BER threshold). For example, in an AMPS system, MTSO 130 may command one or more other cells sites 135 to tune to the present voice channel occupied by PWD 130. These other cell sites may report back the measured signal strength and/or bit error rate. These other cell sites may determine and report back whether the measured signal strength and/or bit error rate meets a threshold for making a handoff alert.

In a D-AMPS system, a mobile assisted handoff (MAHO) technique can be used. PWD 180 measures the received signal strength of signals in the TDMA transmission that correspond to one or more other cell sites 135. This information can be reported by PWD 180 back to MTSO 130 (FIG. 1) for purposes of making a handoff alert.

In another embodiment, a handoff alert could be generated by considering both the signal strength of the link with the serving cell site 135 and the signal strength of a link with one of the other cell sites 135. For example, a handoff alert could be generated when it is determined that the link with the serving cell site 135 is weaker than the link with one of the other cell sites 135. This could be accomplished by measuring and comparing the respective RSSI's and/or BER's. The handoff alert could be generated in other manners.

In step 325, the position of the portable wireless device (e.g., PWD 180 of FIG. 1) is determined. The position may be determined using any suitable localization technology, including those discussed previously.

In one embodiment, the position may be determined by retrieving previously stored location data for the portable wireless device. In other words, referring to FIG. 1, MTSO 130 and/or location system 155 may be tracking the portable wireless device or determining its location on a regular basis, even before the handoff alert is generated. Thus, a very recent position can be used as the current position. Determining the position could also include using less recent positions to generate or extrapolate a position vector and/or to compute a velocity vector. A position vector and/or velocity vector can be used to determine the direction in which and/or the rate at which the portable wireless device is moving.

Alternatively, or in addition to the above embodiment, the position is determined by performing a new location computation. For example, in response to the handoff alert, MTSO 130 and/or location system 155 in FIG. 1 may compute a present location of PWD 180.

At 335, the position is processed to determine a target cell. The target cell, which is based at least in part on the position, can be determined in various manners. According to one embodiment, the target cell may be determined by selecting the cell closest to the position. According to another embodiment, the target cell may be determined by selecting the cell that corresponds to the projected trajectory or position vector of the portable wireless device. According to another embodiment, the target cell may be determined by selecting the cell based on the expected time PWD 180 will spend in the cell based on a velocity vector. According to another embodiment, the target cell may be determined by selecting the cell closest to the portable wireless device (or the cell that is selected based on a position vector and/or velocity vector) that also satisfies a minimum signal strength and/or maximum bit error rate requirement.

According to an embodiment, the target cell may be selected from an initial group of candidate target cells. For example, MTSO 130 may identify a set of candidate target cells for the serving cell that is handing off the call. The set of candidate cells may be those cells proximate to the serving cell. For example, if the serving cell is C1 in FIG. 2, the candidate cells may be B1, G1, D1, A2, E3 and F3. A table of candidate handoff cells may be stored for each cell to account for geographic peculiarities or other variations among cells in cellular system 100. The tables of candidate cells may be different for each cell in cellular system 100.

Alternatively or in addition, candidate target cells could be dynamically determined based on signal strength or bit error rate thresholds.

In yet another embodiment, step 335 for determining a target cell could comprise processing the position based on a stored geographic representation of the cellular coverage area. This geographic representation might include the various roads and highways in the coverage area. A position (e.g., an x, y Cartesian position or an x, y latitude/longitude position) could be correlated to the geographic representation to determine if PWD 180 is traversing a particular road or highway. This correlation could be performed by accessing a geographic information system (GIS) database or similar database for correlating positions to addresses and roads. Accordingly, a position vector or a velocity vector could be processed to determine a road or highway that PWD 180 appears to be traveling. Based on this determination, a particular target cell might be selected.

Coding of algorithms to perform the above logic is well within the skill of the ordinary artisan.

In step 345, the target cell is assigned so that the handoff can be effectuated. In one embodiment, this comprises MTSO 130 (FIG. 1) issuing a command that causes PWD 180 to retune or transfer to the target cell. For example, in an analog AMPS system, MTSO 130 may issue a so-called "blank and burst" command on the existing voice channel that tells PWD 180 to retune to the new cell. This command may include the channel and a so-called supervisory audio tone (SAT) that allows PWD 180 to recognize the right channel.

In cellular systems other than AMPS, such as fully digital TDMA or CDMA systems, MTSO 130 will issue a similar command to cause PWD 180 to change to the new cell. The details of such commands are well within the skill of the ordinary artisan.

The method is complete at 350.

Figure 4:
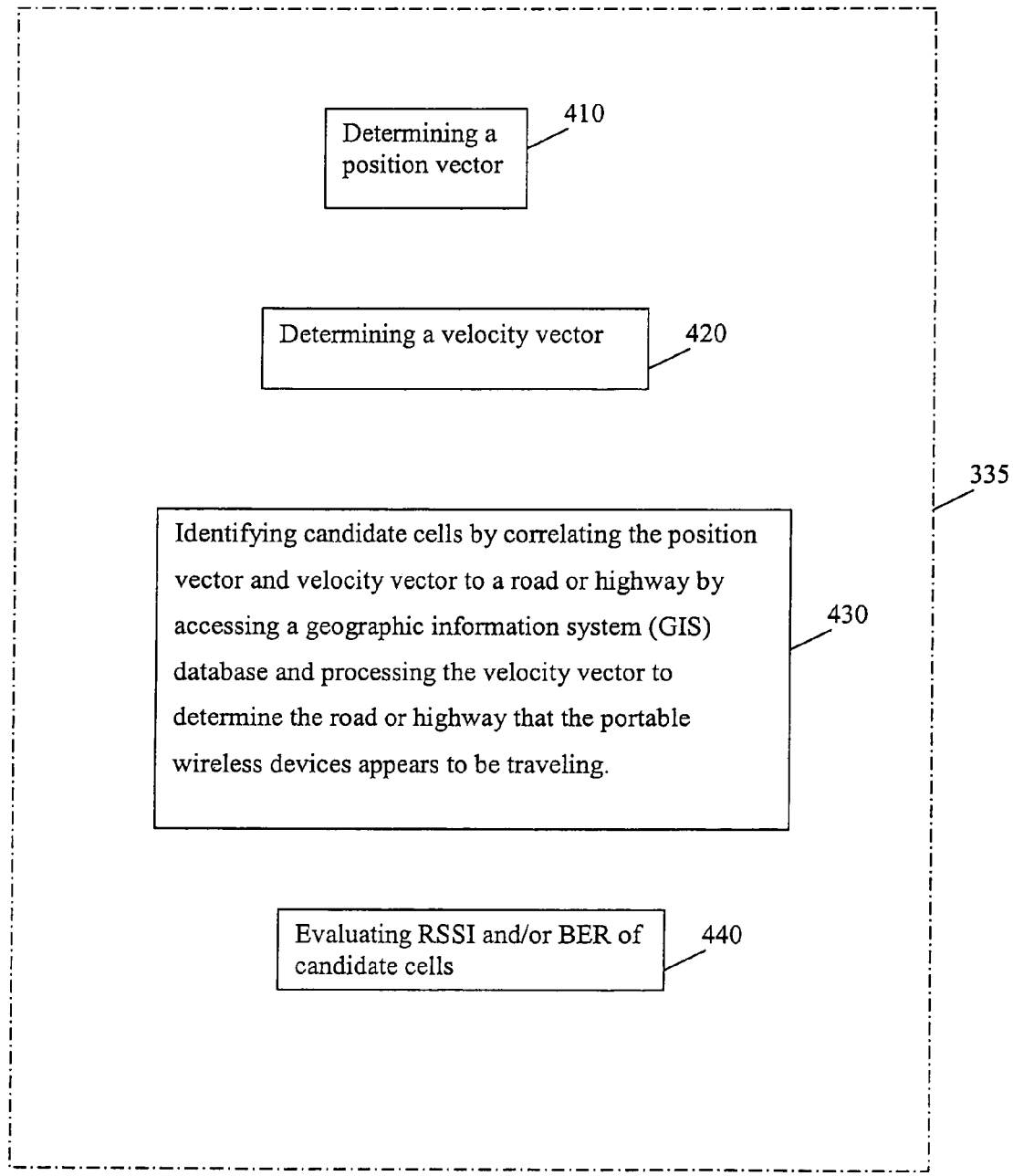
FIG. 4 is a flow chart of a method for determining a target cell based on location information according to an embodiment of the invention.

FIG. 4 is a flow diagram of part of a method for determining a target cell based on location information. In particular, step 335 for determining a target cell may include one or more of the steps of determining a position vector 410, determining a velocity vector 420, identifying candidate target cells 430, and evaluating the signal strength and/or bit error rate of candidate cells 440. Details of these steps were discussed above in connection with FIG. 3.

Figure 5:
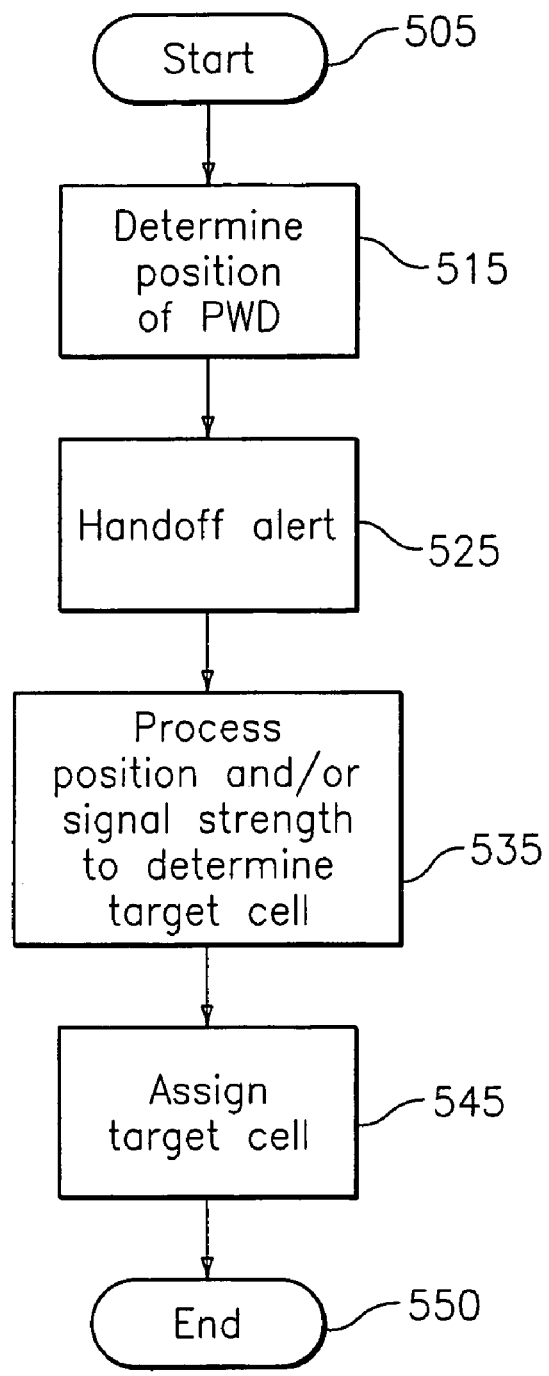
FIG. 5 is a flow chart of a method according to an embodiment of the invention for performing handoffs based on location information.

FIG. 5 is a flow chart of a method according to another embodiment of the invention for performing handoffs based on location information. In this embodiment, location information is used to generate the handoff alert. Selecting a target cell may be based on the location information and/or signal strength. As with FIG. 3, the exemplary method is explained by describing it in conjunction with certain structure from FIG. 1. This is done in order to clearly explain the method, which should not be construed as being limited to that or any other structure.

According to FIG. 5, the method begins at 505. The position of a portable wireless device 180 is determined at 515. Determination of the position may be accomplished using any of the approaches described above for step 325 of FIG. 3. Determination of the position may include generating a position vector and/or a velocity vector.

A handoff alert is generated at 525 based on the position. For example, MTSO 130 (FIG. 1) may generate the handoff alert by determining that the position of PWD 180 is near or approaching the boundary of the serving cell. MSTO 130 may make this determination based on a present position of PWD 130. MSTO 130 may make this determination based on a position vector and/or a velocity vector. In another embodiment, the serving cell 135 may generate the handoff alert.

At 535, the position and/or the signal strength is processed in order to determine a target cell. According to a first embodiment, the position is processed to determine which is the best target cell. The best target cell may be the cell that is closest to PWD 180 or it may be the cell that corresponds best to PWD 180's position vector and/or velocity vector. The best target cell may be selected from a group of candidate cells, as described above for FIG. 3. In a second embodiment, the target cell is selected by measuring the signal strength of a link between PWD 180 and a candidate cell(s). A candidate cell meeting a signal strength threshold (e.g., RSSI and/or BER) may be selected as the target cell. Alternatively, the candidate cell with the best signal strength may be selected. In a third embodiment, both the position and signal strength are processed in order to determine the target cell.

At 545, the target cell is assigned. Assignment of the target cell was discussed above in connection with step 345 of FIG. 3. The method is complete at 550.

Having described the use of location information in the handoff procedure, it can be appreciated that numerous advantages result therefrom. The number and rate of handoffs can be reduced because calls are handed off to the best cell. The processing load on the cellular system can be reduced. The incidence of dropped calls may decrease. The overall capacity of the system can be increased because frequency reuse can increase. Thus, same channel cells may be spaced closer in position. Channels on directly adjacent cells may be spaced closer in frequency. Because the handoff process is simplified, transmissions by fewer candidate cells may be required during the handoff process. Thus, interference noise (e.g., referring to the signal-to-noise ratio based on the so-called C/I+n ratio, where C= strength of the carrier, n=background noise, and I=interference from other cells) may decrease. This may result in an improved signal strength in the link between a portable wireless device and a serving cell, providing more net bandwidth corresponding to greater capacity.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for controlling operations in a cellular system, comprising:
   determining that a handoff is to be made for a portable wireless device operating in a serving cell;
   determining a position of the portable wireless device;
   correlating the position to a road or highway by accessing a geographic information system (GIS) database;
   processing a velocity vector to determine the road or highway that the portable wireless devices appears to be traveling;
   determining a target cell that is geographically closest to the position of the portable wireless device; considering the road or highway in determining the target cell that is geographically closest;
   assigning the portable wireless device to the target cell.

* * * * *